United States Patent [19]

Van Der Mark

[11] Patent Number: 4,673,941
[45] Date of Patent: Jun. 16, 1987

[54] DIGITAL PULSE COMPRESSION FILTER

[75] Inventor: Jacobus Van Der Mark, Apeldoorn, Netherlands

[73] Assignee: Hollandse Signaalapparaten B.V., Hengelo, Netherlands

[21] Appl. No.: 672,517

[22] Filed: Nov. 19, 1984

[30] Foreign Application Priority Data

Dec. 7, 1983 [NL] Netherlands .......................... 8304210

[51] Int. Cl.⁴ ......................... H03H 17/00; G01S 7/28
[52] U.S. Cl. ..................................... 342/201; 342/194; 342/195; 367/100
[58] Field of Search ......... 343/5 FT, 5 NQ, 17.2 PC; 367/100–101; 342/108, 115, 128–132, 134, 135, 194–197, 201–204

[56] References Cited

U.S. PATENT DOCUMENTS

| | | | |
|---|---|---|---|
| 3,156,914 | 11/1964 | Welti | 343/17.2 PC |
| 3,217,324 | 11/1965 | Adamsbaum et al. | 343/17.2 PC |
| 4,028,700 | 6/1977 | Carey et al. | 343/17.2 PC |
| 4,156,876 | 5/1979 | Debuisser | 343/17.2 PC |
| 4,416,016 | 11/1983 | Iapicco | 375/85 |
| 4,556,010 | 1/1986 | Collins | 343/17.2 PC |
| 4,591,857 | 5/1986 | Thor | 343/17.2 PC |

FOREIGN PATENT DOCUMENTS 1046318 10/1966 United Kingdom .

OTHER PUBLICATIONS

M. Skolnik, *Intro. to Radar Systems;* pp. 375–376, (McGraw-Hill, 1980).

F. Lam et al., "A Real-Time Correlation System for Ultrasonic Non-Destructive Testing"; Intl. Journal of Electronics, (vol. 53, No. 2; 1982; pp. 133–147).

Primary Examiner—T. H. Tubbesing
Assistant Examiner—Gregory Bernarr Earl
Attorney, Agent, or Firm—Robert J. Kraus

[57] ABSTRACT

A digital pulse compression filter for use in a radar or sonar transmitting and receiving unit to process sampled and digitized signals. The sampling frequency ($f_s$) is equal to about four times the center frequency ($f_o$) and greater than about twice the bandwidth ($\Delta f$) of these signals. The pulse compression filter (5) comprises a time correlation circuit (7) supplied on the one hand with the sampled and digitized signals and on the other hand with signals representing a replica of the radar or sonar transmitter pulse, whereby one of the two types of signals supplied to the correlation circuit (7) is correlated with the orthogonal components of the other type of signals supplied to the correlation circuit (7) to obtain the orthogonal components of the compressed pulse.

4 Claims, 13 Drawing Figures

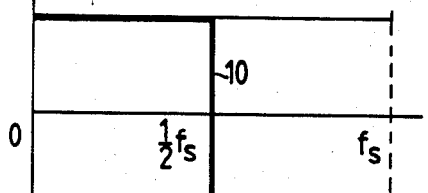
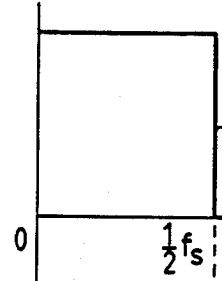
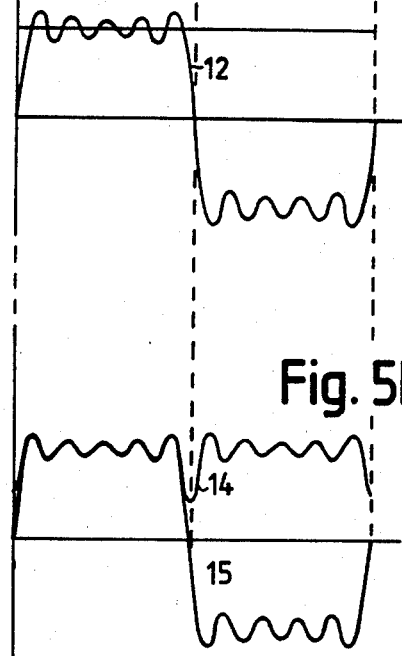
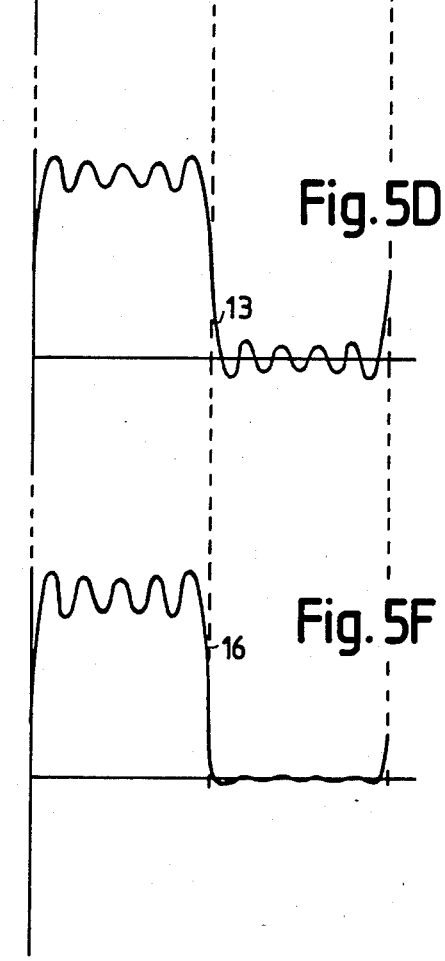

DIGITAL PULSE COMPRESSION FILTER

BACKGROUND OF THE INVENTION

The invention relates to a digital pulse compression filter for a radar or sonar transmitting and receiving unit arranged for the generation and transmission of frequency-modulated transmitter pulses, the reception of echo signals, and the conversion of these signals into sampled and digitised signals.

Various embodiments of digital pulse compression filters are known. U.S. Pat. No. 3,680,105 describes a pulse compression filter utilising a frequency correlation circuit, multiplying the complex conjugate of the discrete Fourier transform of signals representing a replica of the transmitter pulse by the discrete Fourier transform of the sampled and digitised echo signals to obtain the compressed pulse from the obtained product signal through an inverse discrete Fourier transformation. The orthogonal components of the echo signal required for the discrete Fourier transformation are obtainable by quadrature detection in a conventional way. The orthogonal components of the signals representing the replica of the transmitter pulse need be calculated once only. U.S. Pat. No. 4,379,295 describes a digital pulse compression filter, where the orthogonal components of the echo signals obtained by quadrature detection are sampled, digitised and supplied to an FFT unit; the signals supplied over the various frequency output channels are each subjected to a specific delay and combined to form a compressed pulse. These pulse compression filters are however very complicated, while the latter pulse compression filter does not admit of a proper adaptation to the form of the transmitter pulse. The present invention has for its object to obviate these disadvantages to a high degree.

SUMMARY OF THE INVENTION

According to the invention, the sampling frequency ($f_s$) is equal to about four times the centre frequency ($f_o$) of the sampled and digitised signals and greater than about twice the bandwidth ($\Delta f$) of the signals, and the pulse compression filter comprises a time correlation circuit supplied on the one hand with the sampled and digitised signals and on the other hand with signals representing a replica of the transmitter pulse, whereby one of the two types of signals supplied to the correlation circuit is correlated with the orthogonal components of the other type of signals supplied to the correlation circuit to obtain the orthogonal components of the compressed pulse. Hence, the supplied single, sampled and digitised echo signals can be correlated with the orthogonal components of the signals representing the replica of the transmitter pulse, and the orthogonal components of the supplied sampled and digitised echo signals to be obtained in the pulse compression filter with the single signals representing the transmitter pulse.

In the latter case, the sampled and digitised echo signals have to provide the orthogonal components thereof. To this effect a Hilbert filter forming part of the pulse compression filter can be used. The Hilbert filter adds an orthogonal component of these signals to the sampled and digitised echo signals. The orthogonality of the thus obtained signals however does not meet the desired accuracy unless this filter, which is designed as a non-recursive FIR Finite Impulse Response filter, comprises a delay circuit of an impractical length. Not until then the ripple value in the passband and that in the stop band of the Hilbert filter, which values are coupled together here, will be sufficiently small, in order that the added component and the ripple-free component already present are orthogonal to some extent. It is better to add the sampled and digitised signals to two filters forming part of the pulse compression filter. These two filters can be obtained as follows: From a non-recursive FIR filter having a low-pass filter characteristic, of which the pulse reponses h(n) are obtained in accordance with the "Remez Exchange Algorithm", see L. R. Rabiner and G. Gold "Theory and Application of Digital Signal Processing" (Prentice Hall, Inc., 1975), § 3.30 and appendix, pp 187–204. Let the pass band of this filter range from $(k-\frac{1}{4})f_s$ to $(k+\frac{1}{4})f_s$ and the stop band from $(k+\frac{1}{2})f_s$ to $(k+\frac{3}{4})f_s$, where $k = \ldots, -2, -1, 0, 1, 2, \ldots$. By multiplying the pulse responses by a factor $e^{\frac{1}{2}jn\pi}$, so that $h'(n) = h(n) \cdot e^{\frac{1}{2}jn\pi}$, the frequency characteristic is shifted in such a way that the pass band ranges from $kf_s$ to $(k+\frac{1}{2})f_s$ and the stop band from $(k+\frac{1}{2})f_s$ to $(k+1)f_s$. Of the new pulse responses h'(n) the values for n is even are orthogonal with those for n is odd. The even and odd pulse responses then determine the two filters. The pulse responses of one filter are thus $\ldots, h'(-2), 0, h'(0), 0, h'(2), 0, h'(4), \ldots$; and those of the other filter $\ldots, h'(-3), 0, h'(-1), 0, h'(1), 0, h'(3), \ldots$. A more favourable embodiment is obtained by integrating the two filters with an orthogonal pulse response in the correlation circuit. In such a case, the correlation circuit is formed by two non-recursive FIR filters, each of which filters receiving the sampled and digitised signals and correlating these signals with one of the two orthogonal components of the replica of the transmitter pulse. The two filters forming the correlation circuit may be combined to form one single non-recursive FIR filter.

BRIEF DESCRIPTION OF THE DRAWING

The invention will now be explained with reference to the accompanying figures, of which:

FIGS. 5A–5F are diagrams useful in explaining the operation of the embodiments shown in FIGS. 3 and 4.

DESCRIPTION OF THE PREFERRED EMBODIMENTS

Figure 1:
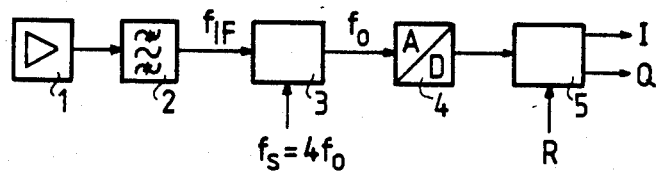
FIG. 1 shows a part of a radar receiving unit having a digital pulse compression filter.

A part of a radar receiving unit is illustrated in FIG. 1. The frequency-modulated, IF-transformed echo signals are obtained from the IF amplifier 1 and the band filter 2 connected thereto. The centre frequency of these signals will then be $f_{IF}$ and their bandwidth $\Delta f$. In circuit 3 the IF signals are sampled at a frequency $f_s$ and then digitised in circuit 4. The sampling frequency is so chosen that a frequency conversion is performed resulting in sampled and digitised signals having a centre frequency $f_o = \frac{1}{4}f_s$. For bandwidth $\Delta f$ of these signals: $\Delta f \leq \frac{1}{2}f_s$. The signals from the analogue-digital converter 4 are supplied to the digital pulse compression filter 5.

Figure 2:
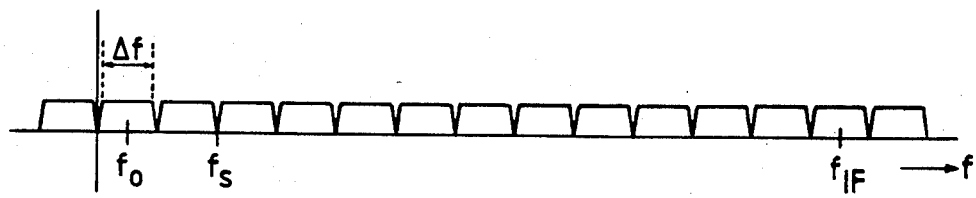
FIG. 2 illustrates a frequency characteristic of the IF-transformed and then sampled FM echo signals.

Filter 5 performs the time correlation with signal R, representing a replica of the transmitter pulse, and supplies the orthogonal components I and Q of the compressed pulse. FIG. 2 shows a frequency characteristic of the sampled and digitised signals; the fundamental frequencies obtained after the sampling of the intermediate frequency signals lie in the frequency interval $[0, \frac{1}{2}f_s]$.

Figure 3:
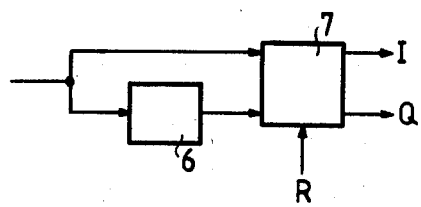
FIGS. 3 and 4 are two embodiments of the digital pulse compression filter according to the invention.
Figure 4:
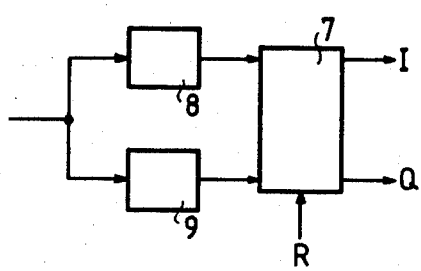

FIG. 3 is an embodiment of the pulse compression filter 5, here comprising a Hilbert filter 6 and a time correlator 7. The Hilbert filter adds an orthogonal component to the input signal of filter 5 to correlate the obtained components with the replica R of the transmitter pulse. FIG. 4 shows an embodiment of the pulse compression filter, comprising two non-recursive FIR filters with a mutual orthogonal pulse response 8 and 9, and the time correlator 7. The orthogonal components obtained with the two filters are in turn correlated with signal R. The results, obtained with the use of a Hilbert filter on the one side and with the use of two filters with an orthogonal pulse response on the other side, can be compared with reference to FIGS. 5A–5F.

FIG. 5A shows the ideal amplitude frequency characteristic 10 in the interval $[0, f_s]$ of a digital filter, used to obtain from a signal f(t) the orthogonal component g(t) thereof, i.e. the Hilbert transform of f(t), where $g(t)=f(t)*(-1/\pi t)$. FIG. 5B illustrates the ideal characteristic for the f(t)+jg(t) signal. The ideal Hilbert filter is of infinite length; the filter used in practice, however, is a non-recursive FIR filter having a limited delay circuit. In such a case, the amplitude-frequency characteristic of the filter is as shown in FIG. 5C, by the numeral 12. In the two intervals $[0, \frac{1}{2}f_s]$ and $[\frac{1}{2}f_s, f_s]$ the ripple is equal to and dependent on the length of the delay circuit applied in the filter. The characteristic for the f(t)+jg(t) signal is then as shown in FIG. 5D by the numeral 13. In the pass and stop bands the ripple is the same. The greater the ripple, the less the orthogonality of the f(t) and g(t) signals with respect to each other. A better orthogonality of the f(t) and g(t) can be obtained by using two filters with orthogonal pulse responses. FIG. 5E illustrates the amplitude-frequency characteristic 14 and 15, of these filters. Since these filters also consist of a non-recursive FIR filter, they also show a ripple depending on the length of the delay circuit; the ripples are however adapted to each other to a high degree, at any rate around the frequency values $\frac{1}{4}f_s$ and $\frac{3}{4}f_s$ and in such a way that the characteristic of the f(t)+jg(t) signal, as indicated in FIG. 5E by the numeral 16, shows a practically rippleless stop band, implying a great mutual orthogonality between the f(t) and g(t) signals.

Figure 6:
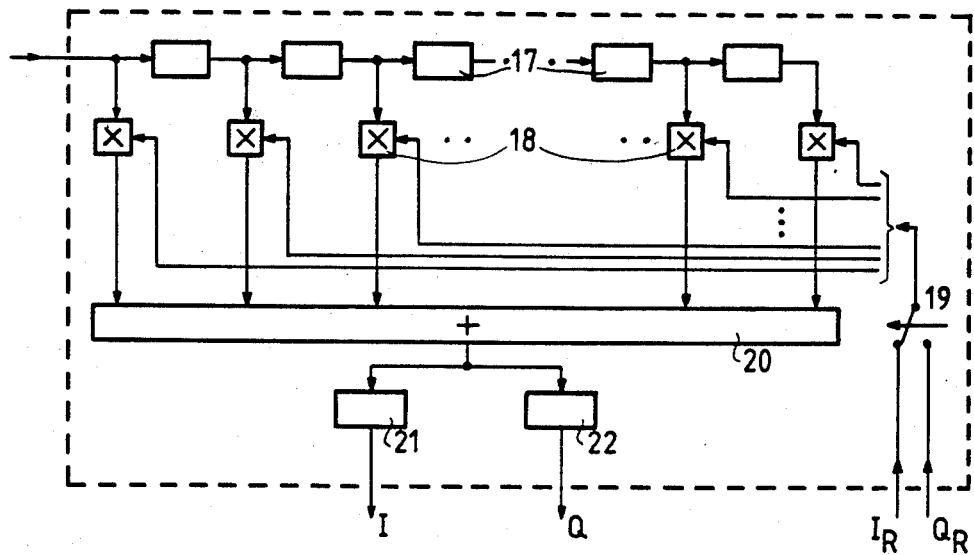
FIGS. 6–8 are three detailed embodiments of the digital pulse compression filter according to the invention.
Figure 7:
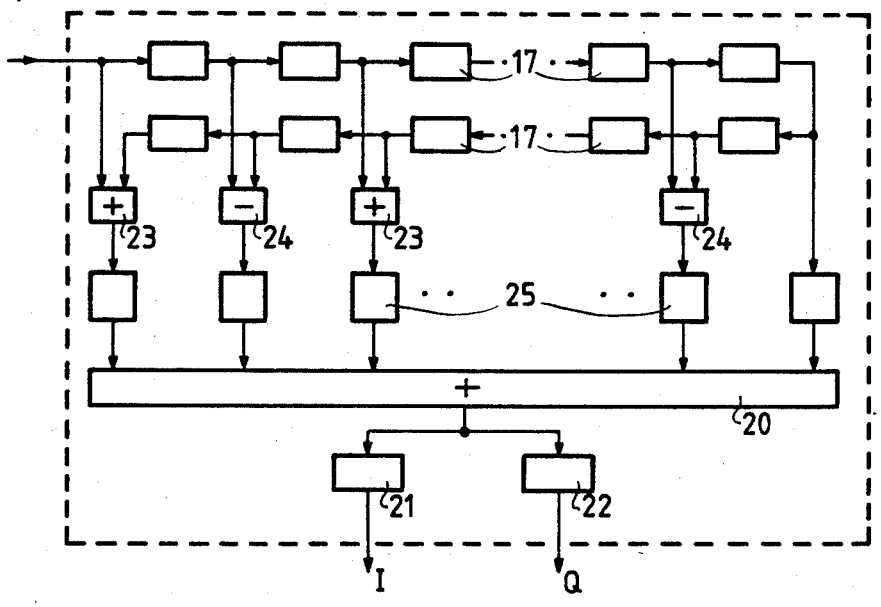
Figure 8:
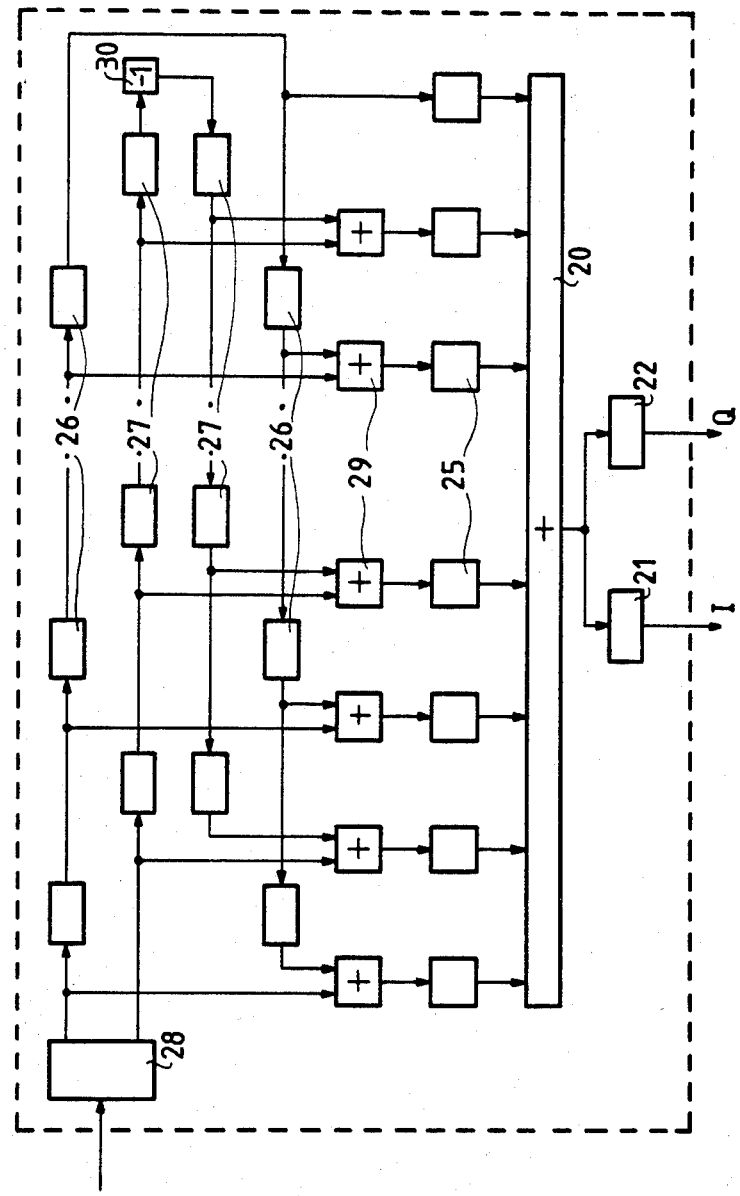

The embodiments of FIGS. 6–8 all represent a pulse compression filter, where the input signal is correlated with the two orthogonal components $I_R$, $Q_R$ of the replica R of the transmitter pulse. Like the replica itself, the $I_R$ and $Q_R$ components can be established by one calculation only, and therefore supplied separately to the pulse compression filter, as shown in the embodiment of FIG. 6, as well as entered in memory means forming part of the pulse compression filter, as indicated by the embodiments of FIGS. 7 and 8. Separate filters for obtaining the orthogonal components of signal R are not required in these embodiments; the pulse compression filter here consists only of a time-correlation circuit. Although this circuit may consist of two separate non-recursive FIR filters it is of greater advantage to combine these two filters to form one single non-recursive FIR filter and to accomplish the working of two filters by correct timing. Therefore, in the embodiments depicted in FIGS. 6–8 the pulse compression filter consists of one single non-recursive FIR filter.

The pulse compression filter of FIG. 6 comprises a delay circuit consisting of N elements 17. Each of the N+1 tappings of this delay circuit is connected to a corresponding multiplying circuit 18. Each of the multiplying circuits 18 is supplied with a certain digital number through the switch 19. These numbers represent either the value of the $I_R$ component, or the value of the $Q_R$ component. Switch 19 is operated at a frequency twice as large as the shifting frequency of the signals through the delay circuit; i.e the pulse repetition frequency of the radar or sonar transmitting and receiving unit. This is to achieve that all signals of the tappings are multiplied both by a series of numbers, representing the value of the $I_R$ component, and by a series of numbers representing the value of the $Q_R$ component. In this way, two series of product values are produced in a time corresponding with the delay time of one of the elements 17, i.e. the shift period. From the two series of product values the adder 20 produces two sum values. Each of the sum values appearing after a half and after a full shift period are alternately fed to the registers 21 and 22. The values loaded in these registers represent the two orthogonal components I and Q of the compressed pulse.

The frequency-modulated signals to be sampled, digitised, and fed to the pulse compression circuit can be expressed by the relationship:

$$A(t)=A_0 \sin[2\pi \int (f_o - \frac{1}{2}\Delta f + \Delta ft/T)dt],$$

where a linear relation between frequency and time is assumed and where, exclusive of the values $f_o$ and $\Delta f$ already defined, $A_0$ is a constant and T the pulse duration. Since the pulse is sampled at a frequency $f_s = 4f_o$ and the total number of samples per pulse equals N+1, while $\beta = (\Delta f/2f_o)$, $t = (g/4f_o)$, and $T = (N/4f_o)$, the amplitude of the signal sample A(k) can be expressed by:

$$A(k)=A_0 \sin 2\pi \{\tfrac{1}{4}k - \tfrac{1}{2}\beta k \cdot (N-k/N)\}$$

and, hence, that of signal sample A(N=k) by:

$$A(N-k)=A_0 \sin 2\pi\{\tfrac{1}{4}N - \tfrac{1}{4}k - \tfrac{1}{2}\beta k \cdot (N-k/N)\}.$$

From these two relationships it follows that, provided N is an even number, $$A(N-K)=(-1)^{\frac{1}{2}N+k}A(k).$$

If now N is chosen to be divisible by 4, then:

$$A(N-k)=(-1)^k A(k).$$

A similar relationship is obtained when the frequency modulation is not linear in time; in such a case, the deviation from the linearity should however be skew-symmetric with respect to the frequency $f_o$. The latter relationship offers the possibility to simplify the embodiment of the pulse compression filter in FIG. 6 to the embodiment shown in FIG. 7. The embodiment of FIG. 7 comprises a delay circuit consisting of N elements. The tappings k and N−k, where k=0, 1, 2, ..., $\frac{1}{2}$N−1, with increasing values of k, are alternately connected to the inputs of an adder 23 and subtractor 24, respectively. The outputs of adder 23 and subtractor 24 are connected to multipliers 25. The tapping ½N is directly coupled to a corresponding multiplier. The numbers forming the $I_R$ and $Q_R$ signals to multiply the output signals of the adder and the subtractor are here already incorporated permanently in the multipliers, or the multipliers contain memory means for storing these numbers. The number of multipliers is then practically halved with respect to the number in the embodiment of FIG. 6. The operation of the embodiment of FIG. 7 is otherwise identical to that in FIG. 6.

A further simplification is provided in the embodiment of FIG. 8. Here the delay circuit is built up of two simultaneously active parts, comprising delay elements 26 and 27. The number of delay elements in each of the parts is ½N. With circuit 28 it is achieved that the added series of signal samples is divided into two parallel series of signal samples to be shifted, viz. a series $A_0$, $A_2$, $A_4$, ... and a series $A_1$, $A_3$, $A_5$, ..., where $A(N-k)=(-1)A(k)$. This division into two separate series of signal samples enables to supply the signals from the tappings of the two delay circuit parts to adders 29 only, as distinct from the embodiment of FIG. 7. It is true that this requires the insertion of an inverter circuit 30 between the ¼Nth and (¼N+1)th delay elements. Another consequence of the division of the signal sample series into two separate series is that the frequency at which the I and Q components are obtained can be halved. The operation of this embodiment is otherwise the same as that of the embodiments of FIGS. 6 and 7.

I claim:

1. A digital pulse compression filter for a radar or sonar transmitting and receiving unit arranged for the generation and transmission of frequency-modulated transmitter pulses, the reception of echo signals, and the conversion of these signals into sampled and digitized signals, the sampling frequency ($f_s$) thereof being equal to about four times the center frequency ($f_o$) of the sampled and digitized signals and greater than about twice the bandwidth ($\Delta f$) of said signals, characterized in that the pulse compression filter comprises a time correlation circuit supplied with the sampled and digitized signals and with signals representing a replica of the transmitter pulse, one of the two types of signals supplied to the correlation circuit being correlated with the orthogonal components of the other type of signals supplied to the correlation circuit to obtain the orthogonal components of the compressed pulse.

2. A digital pulse compression filter as in claim 1, characterized in that the correlation circuit comprises a non-recursive FIR filter for combining said sampled and digitized signals with two orthogonal pulses which represent the replica of the transmitter pulse, said non-recursive FIR filter including a delay circuit having N elements and having N-1 tappings coupled to corresponding multipliers for multiplying the supplied signals alternately with a value determined by one component of the replica of the transmitter pulse and a value determined by the other component of the replica of the transmitter pulse, the summed output signals of the multipliers alternately representing one of the orthogonal components of the compressed pulse.

3. A digital pulse compression filter as in claim 2, characterized in that the tappings k and N−k, where k=0, 1, 2, ... ½N−1, with increasing values of k are alternately connected to inputs of respective adders and subtractors, the output of each adder and subtractor being connected to the input of a corresponding multiplier, the tapping ½N being directly connected to a corresponding multiplier.

4. A digital pulse compression filter as in claim 2, characterized in that the delay circuit comprises first and second simultaneously active parts, each comprising ½/N elements, the second part comprising an inverter circuit inserted between the ¼Nth and (¼N+1)th element, the tappings k and ½N−k of the two parts, where k=0, 1, 2, ..., ¼N−1, being connected to inputs of a respective adder, an output of each adder being coupled to an input of a corresponding multiplier, the tapping ¼N of the first part being directly connected to a corresponding multiplier.

* * * * *